No. 874,978.
PATENTED DEC. 31, 1907.
V. D. MUNGER.
POWER TRANSMISSION GEARING.
APPLICATION FILED MAR. 29, 1907.
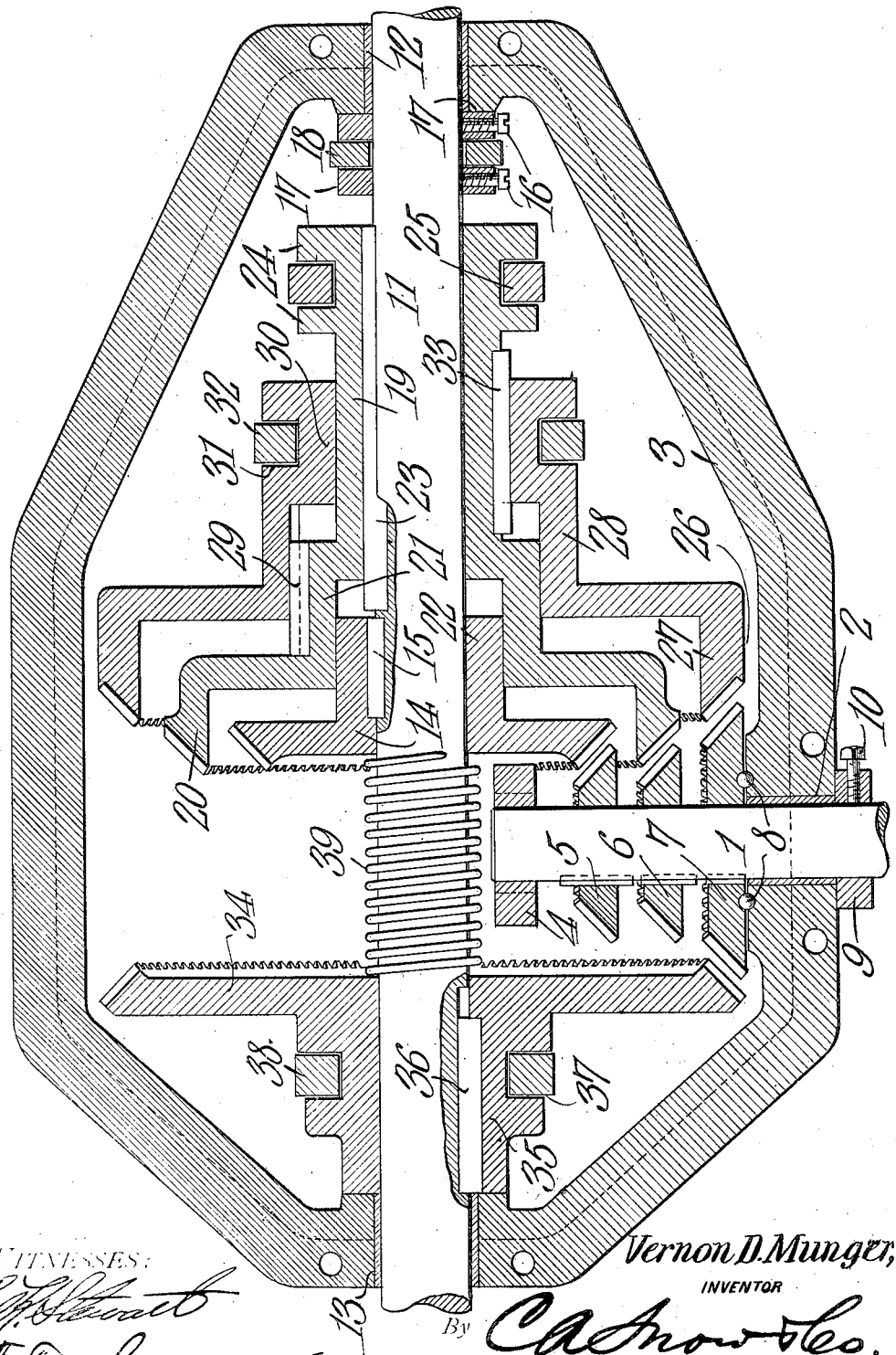
WITNESSES:
Vernon D. Munger,
INVENTOR
By
ATTORNEYS

UNITED STATES PATENT OFFICE.

VERNON D. MUNGER, OF BEACH CITY, OHIO.

POWER-TRANSMISSION GEARING.

No. 874,978.

Specification of Letters Patent.

Patented Dec. 31, 1907.

Application filed March 29, 1907. Serial No. 365,342.

*To all whom it may concern:*

Be it known that I, VERNON D. MUNGER, a citizen of the United States, residing at Beach City, in the county of Stark and State of Ohio, have invented a new and useful Power-Transmission Gearing, of which the following is a specification.

This invention has reference to improvements in transmission gearing for automobiles, and its object is to provide a direct transmission of power from a drive shaft to a driven shaft with either the same speed or different speeds, and in either the same or in opposite directions.

The invention consists essentially in a drive shaft provided with fixed bevel gear wheels or pinions and a driven shaft arranged with its axis at right angles to the axis of the drive shaft and also carrying bevel gear wheels and adjustable longitudinally to bring certain of the gear wheels carried thereby into mesh with certain of the gear wheels on the drive shaft, and with other gear wheels mounted on the driven shaft for rotation therewith and independently adjustable upon said driven shaft and upon each other so that any one of the several gear wheels may be brought into mesh with its corresponding gear wheel upon the drive shaft for causing the rotation of the driven shaft at various speeds and for causing the reversal of the direction of rotation of the driven shaft either at some chosen speed, or, if desired, by the suitable assembling of the gear wheels to rotate the driven shaft in a reverse direction at as many speeds as it is rotated in the forward direction.

The invention will be fully understood from the following detailed description taken in connection with the accompanying drawings forming part of this specification, in which, the figure is a longitudinal section of the improved driving gearing with one-half of the casing removed.

Referring to the drawing, there is shown a drive shaft 1, which may be considered as the drive shaft of a motor carried upon an automobile, which motor may be an electric motor or a steam motor or an explosive motor, as desired. The drive shaft is journaled upon suitable bearings 2, formed in one side of a casing 3, and projects within said casing and at its other or free end has a further journal bearing 4 which may be suitably connected to the sides of the casing in any appropriate manner. Between the journal bearings 2 and 4 the shaft 1 has securely keyed thereon bevel pinions 5, 6 and 7, and between the pinions 7 and the journal bearings 2 there may be provided ball-bearings 8, while a collar 9, exterior to the casing and held to the shaft 1 by a suitable set-screw 10, holds the shaft 1 in fixed relation to the casing so far as longitudinal movement is concerned, but the shaft is free to turn upon its axis.

Extending longitudinally through the casing at right angles to the axis of the shaft 1 is a driven shaft 11 having bearings 12—13 at each end of the casing, as indicated. This shaft is designed to be rotated upon its longitudinal axis and also to be movable for a certain distance in the plane of its longitudinal axis.

Securely keyed to the shaft 11 so as to be moved into or out of mesh with the pinion 5 is a gear wheel 14, fixed to said shaft 11 by a key 15 to rotate therewith and also fixed so as to move in the longitudinal axis of the shaft 11 when the latter is so moved.

Within the casing, near the bearing 12, the shaft 11 has secured thereto by means of set-screws 16 two spaced collars 17 between which is seated a ring 18 under the control of a shifting lever, although, of course, the part 18 instead of being a ring may simply represent the bifurcated end of a shifting lever. By this means the shaft 11 may be shifted longitudinally to bring the gear wheel 14 into mesh with the pinion 5 and so power may be transmitted from the drive shaft 1 to the driven shaft 11 and the latter rotated at a speed commensurate with the speed of the shaft 1 and the comparative sizes of the pinion 5 and the gear wheel 14. Mounted upon the shaft 11 back of the gear wheel 14 is the hub 19 of another gear wheel 20 so situated as to be in position to be brought into mesh with the pinion 6 on the power shaft. The hub 19 of this gear wheel 20 has adjacent to the web of the gear wheel a hub portion 21 of larger diameter than the hub 19 so as to override the hub portion 22 of the gear wheel 14. The hub 19 of the gear wheel 20 is secured to the driven shaft 11 by a spline 23 so as to rotate with this driven shaft but at the same time the gear wheel 20 with its hub is movable longitudinally with relation to said shaft, and for this purpose the end of the hub 19 remote from the gear wheel 20 is provided with a pair of spaced flanges 24 between which rests a ring 25 under the control of a shifting lever, not shown. Like the ring 18 before mentioned, this ring 25 may be replaced by the forked end of the shifting lever. It will be seen that by suitable manipulation of the shifting lever controlling the gear wheel 20, the latter may be moved into and out of mesh with the pinion 6 and power may be transmitted from the shaft 1 to the shaft 11 through the pinion 6 and gear wheel 20, but the speed of the shaft 11 under these circumstances will be less than when the pinion 5 and gear wheel 14 are in mesh.

It will be observed that the gear wheel 20 overhangs or houses the gear wheel 14 and that the pinions 5 and 6 are of about the same size. The pinion 7, however, may be of larger diameter than the pinions 5 and 6, and arranged to engage this pinion 7 is a gear wheel 26 having an overhang portion 27 carrying gear teeth, which overhang portion houses the gear wheel 20. The gear wheel 26 is provided with a hub 28 of such diameter as to ride upon the enlarged portion 21 of the hub 19 of the gear wheel 20. The hub 28 and the hub portion 21 of the gear wheel 20 are connected for synchronous rotation by a spline 29 located in suitable spline seats formed in the meeting faces of the hub portion 21 and the hub 28. The hub 28 has an inwardly-projecting flange 30 at the end remote from the gear wheel 26, and in this flanged portion of the hub there is formed an exterior annular groove 31 receiving the ring 32 of a shifting lever, not shown, but this part 32 may be indicative of the bifurcated end of such shifting lever. Between the inwardly-projecting flange 30 and the hub 19 of the gear wheel 20 is also provided a spline 33. The gear wheel 26 is therefore constrained to move rotatively with the gear wheel 20 but the splines 33 are of suffiient length to permit the gear wheel 26 to be moved longitudinally with relation to said gear wheel 20. Since the gear wheel 20 is splined to the shaft 11 and the gear wheel 26 is splined to the gear wheel 20, the said gear wheel 26 must of necessity rotate with the shaft 11. Therefore, when the gear wheel 26 is brought into mesh with the pinion 7, power from the shaft 1 is transmitted directly to the shaft 11 without the intermediary of other shafts, but in this particular instance the rotation of the shaft 11 is considerably slower than when the pinions 6 or 5 are in mesh with their respective gear wheels 20 and 14.

On the shaft 11 on that side of the shaft 1 opposite to the side carrying the gear wheels 14, 20 and 26, there is another bevel gear wheel 34 having a hub 35 connected to the shaft 11 by a spline 36 but in such manner that this gear wheel 34 may be moved on the shaft 11 in the plane of the axis of the latter. To move this gear wheel 34, its hub is provided with an annular groove 37 in which engages a ring 38 under the control of a suitable shifting lever, but as before stated in relation to the other rings, this ring 38 may be replaced by the bifurcated end of the shifting lever. Surrounding the shaft 11 between the gears 14 and 34 there is a helical spring 39. The gear wheel 34 is provided for the purpose of reversing the direction of rotation of the shaft 11, the said gear wheel 34 being arranged to mesh with the pinion 7.

It will be understood, of course, that by the duplication of the gear wheels 14, 20 and 26 in place of the gear wheel 34 the reverse rotation of the shaft 11 may be effected at the same speeds as are provided for its forward rotation. It will also be understood that all the bearing surfaces may be provided with ball-bearings if so desired similar to the ball-bearings 8 of the pinion 7, these latter ball-bearings being in this instance intended to take up the thrust of the shaft 1 when meshing with any one of the gear wheels.

It will be observed that the nesting of the gear wheels in the manner shown and described permits the direct connection of all the gear wheels with the shaft 11 and at the same time renders the whole structure very compact, strong and rigid. While I have shown the pinion 7 as larger than the pinions 5 and 6, it is evident, of course, that the overhang 27 might be made longer and the pinion 7 be made of the same diameter as the pinions 5 and 6 and thereby a slower rotation of the shaft 11 would be realized than with the proportions shown in the drawings.

It is to be understood, of course, that no attempt at relative proportions has been made in the drawings, and that the proportions and sizes of the various gear wheels and pinions will be varied as the exigencies of the case may demand. It will also be understood that the gear 14 need not, of necessity, be fast on the shaft 11, but that it may have an elongated hub keyed on the shaft and the other gear wheels 20 and 26 may be mounted on said elongated hub in the same manner as they are mounted on the shaft 11.

I claim:—

1. A power transmission gearing comprising a drive shaft, beveled pinions fixed thereon, a longitudinally-adjustable driven shaft, a beveled gear wheel fixed thereon, and other beveled gear wheels mounted on said driven shaft and movable longitudinally thereon, each gear wheel being nested in the next gear wheel of larger size.

2. A power transmission gearing comprising a drive shaft, bevel pinions fixed thereon, a driven shaft having its axis of rotation at right angles to the drive shaft and movable longitudinally in the plane of said axis of rotation, a bevel gear wheel fixed on the driven shaft, and other bevel gear wheels mounted and longitudinally movable on said driven shaft and fixed thereto for rotation therewith, each gear wheel being provided with a hub housed in the hub of the gear wheel of next larger size.

3. In a power transmission gearing, a drive shaft, bevel pinions fixed thereon, a longitudinally movable driven shaft, a gear wheel fixed thereon and movable into mesh with one of the bevel pinions by the longitudinal movement of the driven shaft, another gear wheel movable in the opposite direction to the first gear wheel into mesh with another bevel pinion on the driven shaft, and a spring interposed between said gear wheels on the driven shaft.

4. A power transmission gearing comprising a drive shaft, bevel pinions fixed thereon, a longitudinally movable driven shaft, nested gear wheels carried thereby in operative relation to the pinions on the drive shaft, and another gear wheel also in operative relation to one of the pinions on the drive shaft and connected and movable on said driven shaft for reversing its direction of rotation.

5. A power transmission gearing comprising a drive shaft, pinions fixed thereon, a driven shaft having its axis of rotation at right angles to the axis of rotation of the drive shaft, a fixed gear wheel on said driven shaft, another gear wheel thereon fixed for rotation therewith but longitudinally movable with relation to said driven shaft, another bevel gear wheel mounted on said second gear wheel and fixed thereto for rotation therewith but longitudinally movable with relation thereto, another gear wheel mounted upon said driven shaft for rotation therewith and movable with relation thereto for engagement with one of the pinions on the drive shaft, and a spring interposed between the fixed gear wheel on the driven shaft and the last-named gear wheel thereon.

In testimony that I claim the foregoing as my own, I have hereto affixed my signature in the presence of two witnesses.

VERNON D. MUNGER.

Witnesses:
 ARCH BOSE,
 W. W. GLENN.